(12) United States Patent
Wang

(10) Patent No.: US 11,143,345 B2
(45) Date of Patent: Oct. 12, 2021

(54) DEFLATION APPARATUS

(71) Applicant: NINGBO BRAVO MANUFACTURING OF INFLATORS AND ACCESSORIES CO., LTD., Ningbo (CN)

(72) Inventor: Bin Wang, Ningbo (CN)

(73) Assignee: NINGBO BRAVO MANUFACTURING OF INFLATORS AND ACCESSORIES CO., LTD.

( * ) Notice: Subject to any disclaimer, the term of this patent is extended or adjusted under 35 U.S.C. 154(b) by 66 days.

(21) Appl. No.: 16/673,712

(22) Filed: Nov. 4, 2019

(65) Prior Publication Data
US 2020/0149648 A1    May 14, 2020

(30) Foreign Application Priority Data

Nov. 12, 2018  (CN) .......................... 201811338552.8
Nov. 12, 2018  (CN) .......................... 201821853930.1

(51) Int. Cl.
| | |
|---|---|
| *F16K 31/528* | (2006.01) |
| *B63B 32/51* | (2020.01) |
| *F16L 29/02* | (2006.01) |
| *B63H 16/04* | (2006.01) |
| *F16K 24/04* | (2006.01) |

(52) U.S. Cl.
CPC .............. *F16L 29/02* (2013.01); *B63B 32/51* (2020.02); *B63H 16/04* (2013.01); *F16K 31/528* (2013.01); *F16K 24/04* (2013.01)

(58) Field of Classification Search
CPC ........ F16K 15/18; F16K 15/20; F16K 31/528; F16K 31/5286; F16K 35/06; B63B 7/08; B63B 7/085; B63B 32/51; B63B 34/22; B63B 34/52; B63B 34/56; B63H 16/04; F16L 29/02; F16L 37/38
See application file for complete search history.

(56) References Cited

U.S. PATENT DOCUMENTS

| | | | | |
|---|---|---|---|---|
| 5,667,195 A | * | 9/1997 | McCormick ....... | F01M 11/0408 184/1.5 |
| 2004/0121670 A1 | * | 6/2004 | Millhollin ............. | B63B 35/613 441/40 |
| 2018/0251364 A1 | * | 9/2018 | Scott ................... | F16K 27/0209 |

FOREIGN PATENT DOCUMENTS

| | | | | | |
|---|---|---|---|---|---|
| GB | | 842260 A | * | 7/1960 | .............. F16L 29/02 |
| WO | WO-2016059179 A1 | | * | 4/2016 | ............. F16K 15/20 |

* cited by examiner

*Primary Examiner* — Hailey K. Do
(74) *Attorney, Agent, or Firm* — Dickinson Wright PLLC

(57) ABSTRACT

A deflation apparatus includes a cylindrical deflation main body including a socket portion and an exhausting portion. The socket portion includes an opening for receiving a spool of a valve and the opening is connected to an inner space, being through the socket portion and the exhausting portion, and an outer wall of the exhausting portion includes a plurality of exhausting holes connected to the inner space. An exhausting direction of the exhausting holes is orthogonal to the longitudinal axis of the deflation main body. A flat stream leading portion, in the inner space, is configured to separate the inner space to form at least two exhausting channels. Each of the exhausting channels is connected to at least one of the exhausting holes. The flat stream leading portion has an abut side, wherein the abut side is extended toward the opening and abuts the spool of the valve.

13 Claims, 7 Drawing Sheets

DEFLATION APPARATUS

CROSS REFERENCE

This application is based upon and claims the benefit of priority of Chinese Patent Application No. 2018113385528, filed on Nov. 12, 2018 and Chinese New Model Patent Application No. 2018218539301, filed on Nov. 12, 2018, the entire contents thereof are incorporated herein by reference.

TECHNICAL FIELD

The present disclosure relates to the field of air exhausting, specifically to a deflation apparatus.

BACKGROUND

In the current market, most of inflatable surfboards, tents, inflatable boats and other inflatable products do not have matched protection device for deflation apparatus. For inflatable products with high air pressure, e.g. an inflatable surfboard with the maximum air pressure 2 bar, when a user want to exhaust the air in the inflatable surfboard by pressing the valve with the user's finger, it is difficult to exhaust the air even the user press the valve with a force about 10 KG. Moreover, if the user presses the valve with the finger without any protections, the air flow with high air pressure, instantly rushed out, will hurt the user' finger.

SUMMARY

In the light of the problems of the prior art, an objective of the present disclosure is to provide a deflation apparatus. In the present disclosure, high pressure air in an inflatable product is exhausted from a valve of the inflatable product through a plurality of exhausting channels and a plurality of exhausting holes, connected to the corresponding exhausting channels and disposed on the outer wall of the deflation apparatus. Therefore, the finger of the user is protected and the exhausting efficiency is increased. Moreover, the exhausting process is able to continuously proceed and the exhausting efficiency is increased, since the deflation apparatus is clamped with the valve by the clampers.

In one embodiment of the present disclosure, a deflation apparatus includes a cylindrical deflation main body including a socket portion and an exhausting portion sequentially arranged along a longitudinal axis of the cylindrical deflation main body, wherein the socket portion includes an opening for receiving a spool of a valve and the opening is connected to an inner space, wherein the inner space extends through the socket portion and the exhausting portion, and an outer wall of the exhausting portion includes a plurality of exhausting holes connected to the inner space.

An exhausting direction of the exhausting holes is orthogonal to the longitudinal axis of the cylindrical deflation main body and a flat stream leading portion, in the inner space, is configured to separate the inner space to form at least two exhausting channels extended along the longitudinal axis of the cylindrical deflation main body, wherein each of the at least two exhausting channels is connected to at least one of the plurality of exhausting holes. The flat stream leading portion has an abut side, wherein the abut side is extended toward the opening and abuts the spool of the valve.

In one embodiment of the present disclosure, a connecting rod of a boat paddle includes a deflation apparatus disposed at a connecting portion of the connecting rod and the connection portion is configured to connect a pulp board.

The deflation apparatus further includes a cylindrical deflation main body including a socket portion and an exhausting portion sequentially arranged along a longitudinal axis of the cylindrical deflation main body, wherein the socket portion includes an opening for receiving a spool of a valve and the opening is connected to an inner space, wherein the inner space extends through the socket portion and the exhausting portion, and an outer wall of the exhausting portion includes a plurality of exhausting holes connected to the inner space.

An exhausting direction of the exhausting holes is orthogonal to the longitudinal axis of the cylindrical deflation main body and a flat stream leading portion, in the inner space, is configured to separate the inner space to form at least two exhausting channels extended along the longitudinal axis of the cylindrical deflation main body, wherein each of the at least two exhausting channels is connected to at least one of the plurality of exhausting holes. The flat stream leading portion has an abut side, wherein the abut side is extended toward the opening and abuts the spool of the valve.

In order to further understand the features and technical contents of the present disclosure please refer to the following detailed description and drawings related to the present disclosure. However, the detailed description and the drawings are merely illustrative of the disclosure and are not intended to limit the scope of the claims.

BRIEF DESCRIPTION OF THE DRAWINGS

Embodiments of the present disclosure will now be described, by way of example only, with reference to the accompanying schematic drawings in which corresponding reference symbols indicate corresponding parts, and in which.

DETAILED DESCRIPTION

In the following, embodiments of the present disclosure will be described in detail referring to figures. The concept and its realizations of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to the technicians in the art fully. Same reference signs in the figures refer to same or similar structures, so repeated description of them will be omitted.

Figure 1:
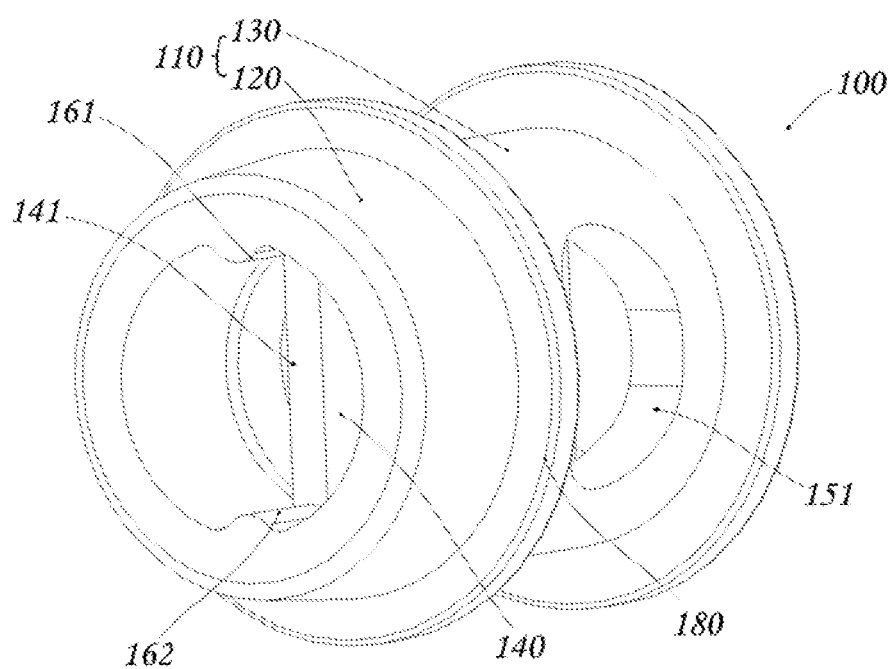
FIG. 1 shows a schematic view of a deflation apparatus of one embodiment of the present disclosure.
Figure 2:
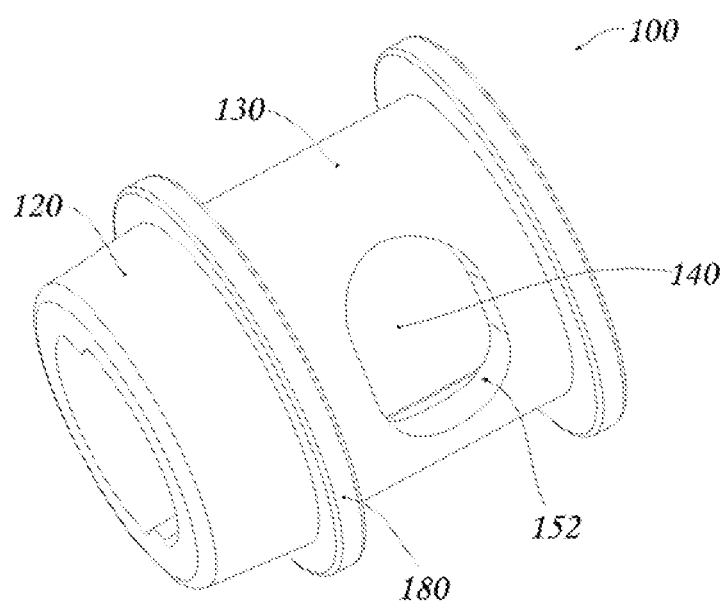
FIG. 2 shows another schematic view of the deflation apparatus of FIG. 1.

In one embodiment of the present disclosure, a deflation apparatus 100 is disclosed. FIG. 1 shows a schematic view of the deflation apparatus 100 of one embodiment of the present disclosure. FIG. 2 shows another schematic view of the deflation apparatus 100 of FIG. 1. The deflation apparatus 100 includes a deflation main body 110 and a flat stream leading portion 140 disposed in an inner space of the deflation main body 110. In this embodiment, the deflation apparatus 100 includes a cylindrical deflation main body.

The deflation main body 110 includes a socket portion 120 and an exhausting portion 130 sequentially arranged along a longitudinal axis of the deflation main body 110. Moreover, the opening is connected to the inner space, wherein the inner space extends through the socket portion 120 and the exhausting portion 130, of the deflation main body 110. The deflation main body 110 further includes a side wall which is disposed at an end opposite the opening.

The opening of socket 120 is used for receiving a spool 210 of a valve 200, which means the spool 210 of the valve 200 enters into the inner space via the opening of the socket 120. As shown in FIGS. 1 and 2, an outer wall of the exhausting portion 130 includes two exhausting holes, a first exhausting hole 151 and a second exhausting hole 152, respectively connected to the inner space. In this embodiment, an exhausting direction of the exhausting holes is orthogonal to the longitudinal axis of the deflation main body 110. The exhausting hole includes a circular exhausting hole. In some embodiments, the exhausting hole includes a rectangle exhausting hole. In some other embodiments, the exhausting hole includes an oval exhausting hole. In some embodiments, an outer wall of the exhausting portion 130 includes a plurality of exhausting holes respectively connected to the inner space.

As shown in FIGS. 1 and 2, the flat stream leading portion 140 in the inner space of the 110 includes a rectangle board. In this embodiment, the stream leading portion 140 is disposed in the inner space of the deflation main body 110 and along the longitudinal axis of the of the deflation main body 110 which means the length direction of the stream leading portion 140 is parallel to the longitudinal axis of the of the deflation main body 110.

In this embodiment, the flat stream leading portion 140 has an abut side 141, wherein the abut side is extended toward the opening of the deflation main body 110, and abuts the spool 210 of the valve 200 to push the spool 210 for exhausting air. Two length sides of the stream leading portion 140 and an end side, opposite to the abut side, of the stream leading portion 140 are in contact with the inner wall of the deflation main body 110. Therefore, the inner space of the deflation main body 110 is separated to form two exhausting channels, a first exhausting channel and a second exhausting channel, extended along the longitudinal axis of the deflation body 110.

Moreover, each of the two exhausting channels is connected to an exhausting hole. In this embodiment, the first exhausting channel is connected to the first exhausting hole 151 and the second exhausting channel is connected to the second exhausting channel 152. In some embodiments, the first exhausting hole 151 and the second exhausting hole 152 are symmetrically disposed to and toward the flat stream leading portion 140.

In this embodiment, an L-shape exhausting path is formed by the first exhausting channel and the first exhausting hole 151. Moreover, another L-shape exhausting path is formed by the second exhausting channel and the second exhausting hole 152. Thus, the air exhausted from the valve 200 is then leaded along the paths and exhausted via the exhausting holes located on the sides of the deflation apparatus 100.

In this embodiment, a first strip-shaped boss 161 and a second strip-shaped boss 162 are disposed on the inner wall of the socket portion 120. The length direction of the bosses is parallel to the longitudinal axis of the deflation main body 110. As shown in FIGS. 1 and 2, an end surface of the first strip-shaped boss 161 is flush with an end surface of the opening of the deflation main body 110. Another end surface of the first strip-shaped boss 161 is abutted the abut side 141 of the stream leading portion 140.

An end surface of the second strip-shaped boss 162 is flush with the end surface of the opening of the deflation main body 110. Another end surface of the second strip-shaped boss 162 is abutted the abut side 141 of the stream leading portion 140. Therefore, the structure stability and strength of the stream leading portion 140 are enhanced through the structure configuration of the first strip-shaped boss and the second strip-shaped boss.

Moreover, the deflation main body 110 further includes a limit boss 180 on the outer wall of the deflation main body 110. The limit boss 180 is a circular ring shape which surrounds the outer wall of the deflation main body 110. The limit boss 180 is configured to limit a length, entering the valve 200, of the deflation main body 110. The damages of the spool 210 caused by improper operations are then decreased as well.

Figure 3:
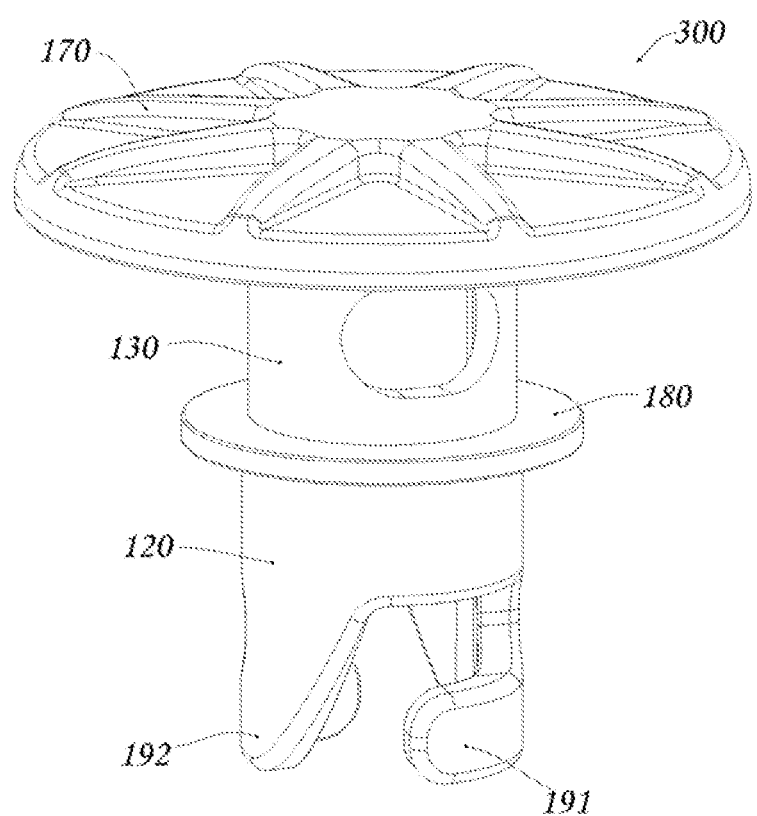
FIG. 3 shows a schematic view of a deflation apparatus having clampers of one embodiment of the present disclosure.
Figure 4:
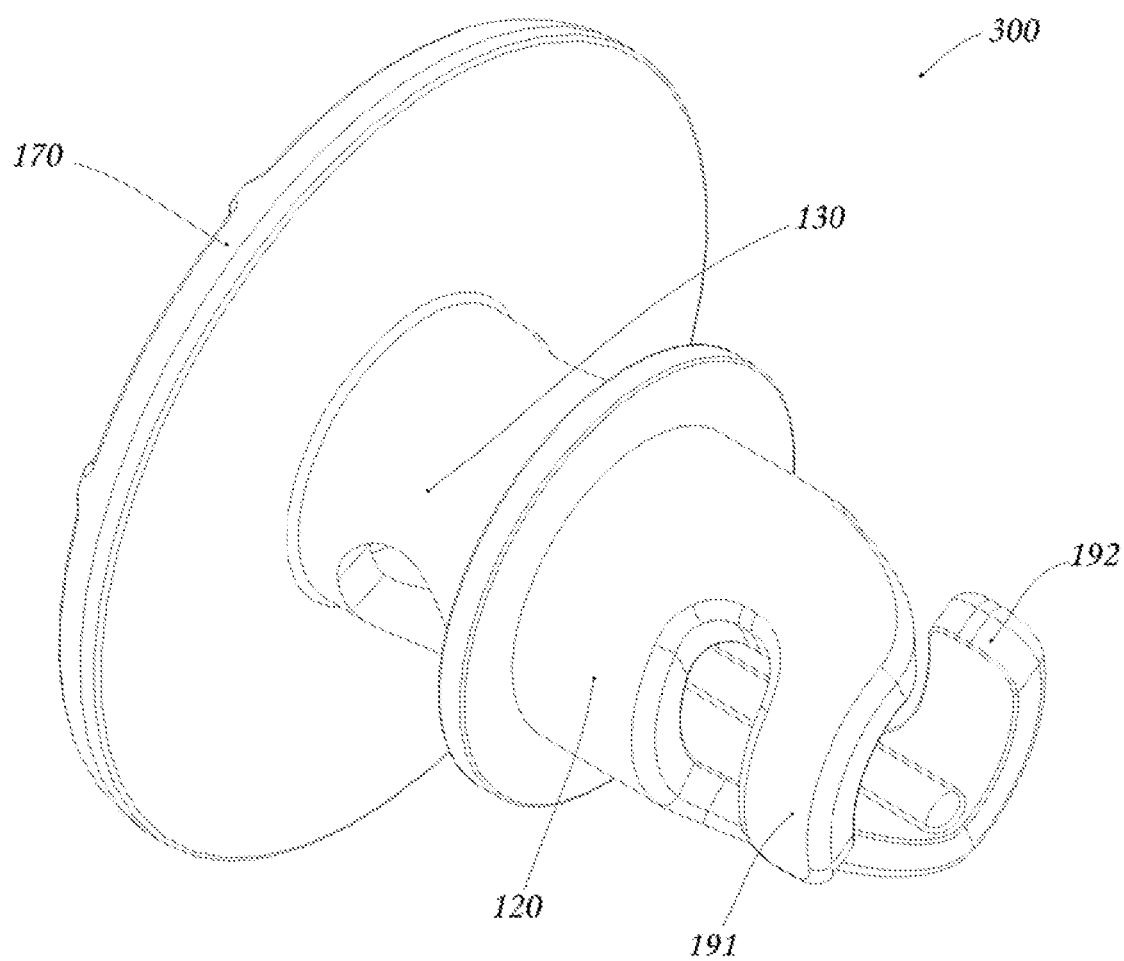
FIG. 4 shows another schematic view of the deflation apparatus of FIG. 3.

FIG. 3 shows a schematic view of a deflation apparatus 300 having clampers of one embodiment of the present disclosure. FIG. 4 shows another schematic view of the deflation apparatus 300 of FIG. 3. As shown in FIGS. 3 and 4, in this embodiment, the deflation apparatus 300 is similar to the deflation apparatus 100 of FIG. 1 but further includes a first clamper 191 and a second clamper 192 which are respectively disposed at the end surface of the opening of the socket 120. The first clamper 191 and the second clamper 192 are symmetrically disposed about the longitudinal axis of the deflation main body 110. In this embodiment, the first clamper 191 includes an L-shape clamper. The second clamper 192 includes an L-shape clamper. Moreover, when the socket 120 is inserted into the valve 200 and the spool 210 is received in the socket 120, first clamper 191 and the second clamper 192 are clamped with a corresponding clamping structure of the valve by screwing the deflation main body 110.

As shown in FIGS. 3 and 4, the deflation main body 110 includes a disc hand wheel 170 at an end of the exhausting portion of the deflation main body 110, opposite the opening of the socket portion 120. Therefore, the user is capable of easily operating the deflation apparatus 300.

Figure 5:
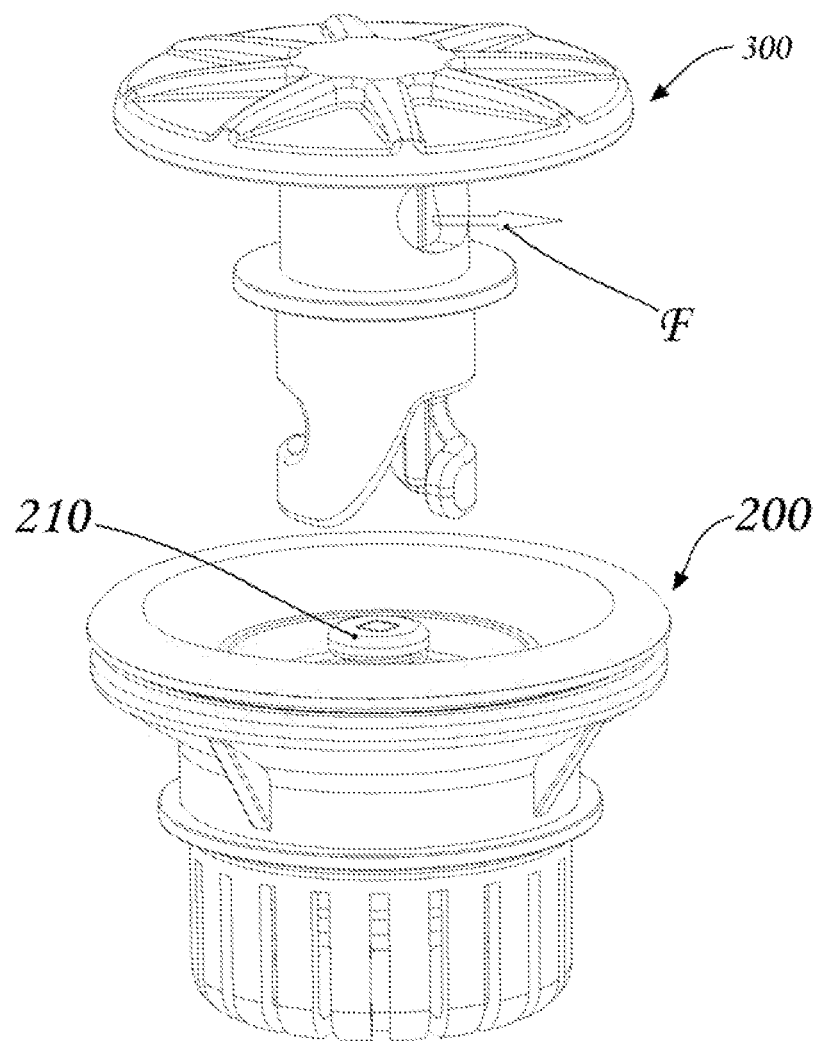
FIG. 5 shows a schematic view of a deflation process implemented by the deflation apparatus of FIG. 3.

FIG. 5 shows a schematic view of a deflation process implemented by the deflation apparatus 300 of FIG. 3. When an inflated apparatus, e.g. inflated surfboards, tents, inflated boats, is necessary to be exhausted, the user inserts the socket 120 of the deflation apparatus 300 into the valve 200 and screw the deflation main body 110 to let the clampers be clamped, the air in the inflated apparatus is then exhausted from the first exhausting hole 151 and the second exhausting hole 152, e.g. F direction shown in FIG. 5.

Figure 6:
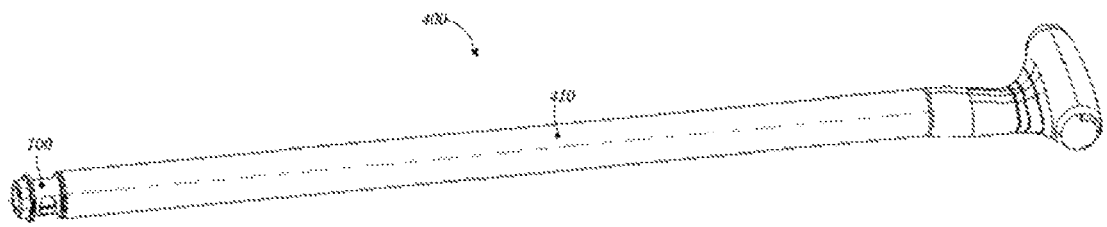
FIG. 6 shows a schematic view of a connecting rod of a boat paddle of one embodiment of the present disclosure.

The present disclosure further discloses a connecting rod 400 of a boat paddle. FIG. 6 shows a schematic view of the connecting rod 400 of the boat paddle of one embodiment of the present disclosure. In this embodiment, the deflation apparatus 100 is disposed at a connecting portion of the connecting rod 400, wherein the connection portion is configured to connect a pulp board (not shown).

When the connecting rod 400 is connected to the pulp board, the deflation apparatus 100 is then hidden in the pulp board. When the air in the inflated apparatus is needed to be exhausted, the pulp board is removed and the connecting rod 400 is used to exhaust the air in the inflated apparatus.

Figure 7:
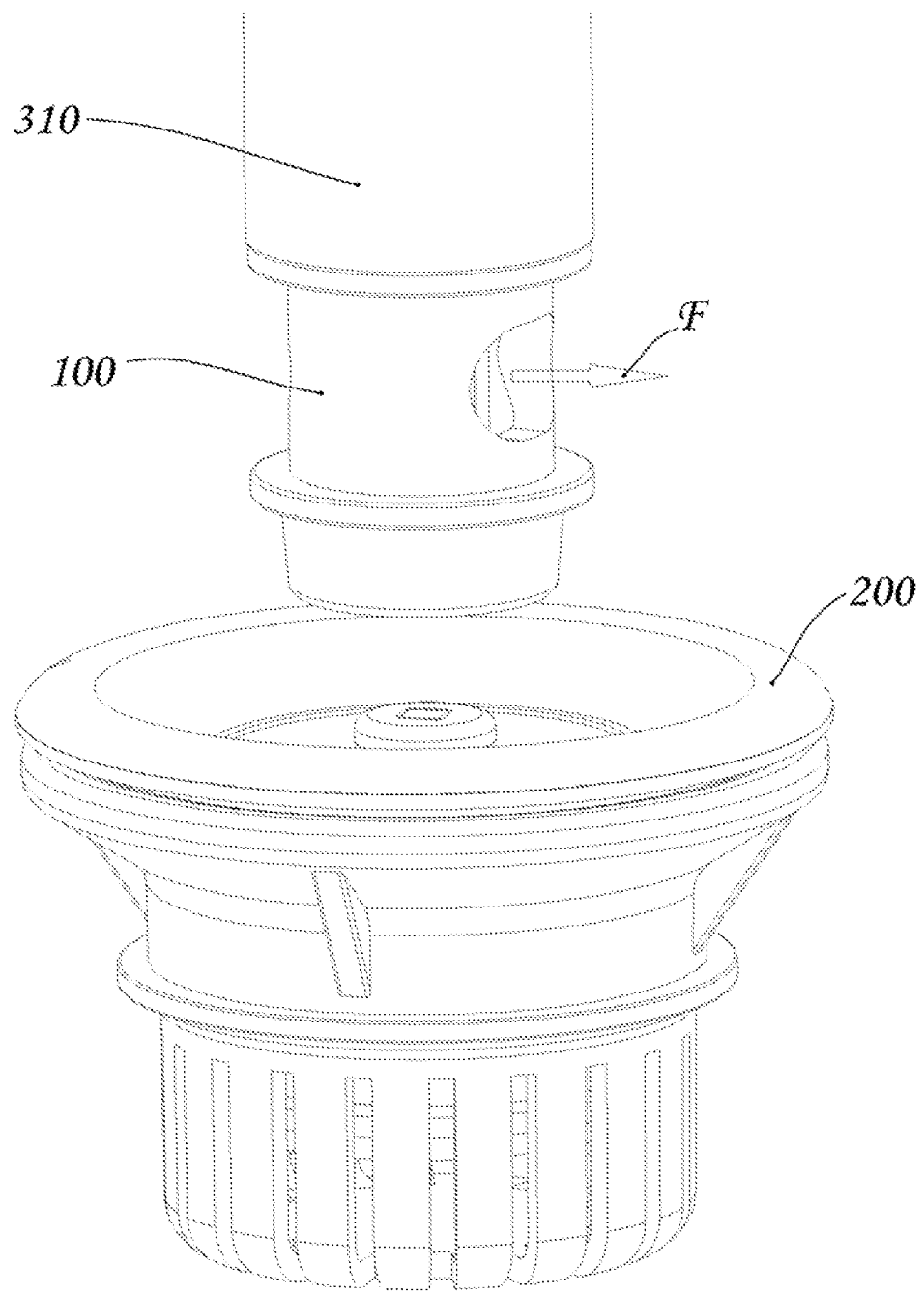
FIG. 7 shows a schematic view of a deflation process implemented by the deflation apparatus of FIG. 6.

FIG. 7 shows a schematic view of a deflation process implemented by the deflation apparatus 100 of FIG. 6. When an inflated apparatus, e.g. inflated surfboards, inflated boats, is necessary to be exhausted, the user inserts the socket 120 of the deflation apparatus 300 into the valve 200 and pushes the connecting rod 400. The air in the inflated apparatus is then exhausted from the first exhausting hole 151 and the second exhausting hole 152, e.g. F direction shown in FIG. 7.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A deflation apparatus, comprising:
    a cylindrical deflation main body including a socket portion and an exhausting portion sequentially arranged along a longitudinal axis of the cylindrical deflation main body, wherein the socket portion includes an opening for receiving a spool of a valve and the opening is connected to an inner space, wherein the inner space extends through the socket portion and the exhausting portion, and an outer wall of the exhausting portion includes a plurality of exhausting holes connected to the inner space, wherein an exhausting direction of the plurality of exhausting holes is orthogonal to the longitudinal axis of the cylindrical deflation main body; and
    a flat stream leading portion disposed in the inner space and configured to separate the inner space to form at least two exhausting channels extended along the longitudinal axis of the cylindrical deflation main body, wherein each of the at least two exhausting channels is connected to at least one of the plurality of exhausting holes;
    wherein the flat stream leading portion has an abut side, wherein the abut side is extended toward the opening and abuts the spool of the valve.

2. The deflation apparatus of claim 1, wherein each of the plurality of exhausting holes includes a rectangle exhausting hole.

3. The deflation apparatus of claim 1, wherein the plurality of exhausting holes includes an oval exhausting hole.

4. The deflation apparatus of claim 1, wherein the plurality of exhausting holes includes a circular exhausting hole.

5. The deflation apparatus of claim 1, wherein the cylindrical deflation main body includes a disc hand wheel at an end of the exhausting portion, opposite the opening of the socket portion.

6. The deflation apparatus of claim 1, wherein an outer wall of the cylindrical deflation main body includes a limit boss.

7. The deflation apparatus of claim 1, wherein the socket portion comprises a first clamper and a second clamper for clamping the spool of the valve, wherein the first and second clampers are symmetrically disposed about the longitudinal axis of the cylindrical deflation main body.

8. The deflation apparatus of claim 7, wherein the first clamper includes an L-shape clamper.

9. The deflation apparatus of claim 7, wherein the second clamper includes an L-shape clamper.

10. The deflation apparatus of claim 1, further comprising an L-shape exhausting path formed by one of the at least two exhausting channels and one of the plurality of exhausting holes.

11. The deflation apparatus of claim 10, wherein the flat stream leading portion is configured to separate the inner space to form a first exhausting channel and a second exhausting channel, and the outer wall of the exhausting portion includes a first exhausting hole and a second exhausting hole, wherein the first exhausting hole and the second exhausting hole are symmetrically disposed and extend toward the flat stream leading portion.

12. The deflation apparatus of claim 11, wherein the socket portion comprises a first strip-shaped boss and a second strip-shaped boss, and each of the first and second strip-shaped bosses includes an end respectively abutting the abut side of the flat stream leading portion.

13. A connecting rod of a boat paddle, comprising:
    a deflation apparatus disposed at a connecting portion of the connecting rod, wherein the connection portion is configured to connect a pulp board;
    wherein the deflation apparatus further comprises:
        a cylindrical deflation main body including a socket portion and an exhausting portion sequentially arranged along a longitudinal axis of the cylindrical deflation main body, wherein the socket portion includes an opening for receiving a spool of a valve and the opening is connected to an inner space, wherein the inner space extends through the socket portion and the exhausting portion, and an outer wall of the exhausting portion includes a plurality of exhausting holes connected to the inner space, wherein an exhausting direction of the plurality of exhausting holes is orthogonal to the longitudinal axis of the cylindrical deflation main body; and
        a flat stream leading portion disposed in the inner space and configured to separate the inner space to form at least two exhausting channels extended along the longitudinal axis of the cylindrical deflation main body, wherein each of the at least two exhausting channels is connected to at least one of the plurality of exhausting holes;
    wherein the flat stream leading portion has an abut side, wherein the abut side is extended toward the opening and abuts the spool of the valve.

* * * * *